Feb. 7, 1967 H. E. VOIGT 3,303,477

APPARATUS FOR FORMING EFFECTIVE MEMORY ADDRESSES

Filed Oct. 8, 1964 2 Sheets-Sheet 1

INVENTOR
Heinz E. Voigt

BY Spencer & Kaye

ATTORNEYS

Feb. 7, 1967 H. E. VOIGT 3,303,477

APPARATUS FOR FORMING EFFECTIVE MEMORY ADDRESSES

Filed Oct. 8, 1964 2 Sheets-Sheet 2

INVENTOR
Heinz E. Voigt
BY Spencer & Kaye
ATTORNEYS 3,303,477

APPARATUS FOR FORMING EFFECTIVE MEMORY ADDRESSES

Heinz E. Voigt, Constance, Germany, assignor to Telefunken Patentverwertungsgesellschaft m.b.H., Ulm (Danube), Germany Filed Oct. 8, 1964, Ser. No. 402,386
Claims priority, application Germany, Oct. 8, 1963, T 24,849
6 Claims. (Cl. 340—172.5)

The present invention relates to an address adder for a program-controlled computer with an addressable store. The adder forms an effective address, which describes a cell of the store, by the addition of a relative address, given by an instruction, and a reference address.

An expression composed of binary digits, which clearly describes a cell in the store and is introduced into a storage address register to control this cell, is termed an effective address. For various reasons, a storage cell is frequently designated in the instructions not by the effective address but by a relative address which differs from the effective address by a substantially constant quantity, the reference address. In general, the reference address is fed into a register provided for the purpose, by the programmer, at the beginning of a program comprising numerous instructions, and is added to each relative address which appears.

A device of this type is also suitable for extending the range of addresses when the store is enlarged. Because of the demand for interchangeability in programs, it is desirable to make the instruction structure, and hence the length of the relative address, independent of the construction of the store, that is to say of the length of the effective address. In known installations, this is achieved in that only the reference address is lengthened on enlargement of the store, so that an effective address of the necessary length is obtained by the addition of the shorter relative address.

With these features of the prior art in mind, it is a main object of the present invention to solve the above-mentioned problem with less expenditure and with the additional effect that the relative address also has a number of binary digits which is independent of the particular store construction.

These objects and other ancillary thereto are accomplished in accordance with preferred embodiments of the invention, wherein not only the relative address but also the reference address comprises fewer binary digits than are necessary for the clear distinction between all the storage cells. The address adder is adapted for the addition of the leading $n$ digital places in the relative address to the reference address, while the latter comprises $m$ digital places with $m>n$, for example $m=2n$. According to the further invention, the number $n$ is reduced when the store capacity is enlarged in comparison with the standard construction, for example by one if the store is doubled, while the value $m$ remains constant.

This magnitude of the number $n$ merely influences the place relationship between the relative address and the address adder so that in this manner allowance is made for any size of store with the particular length of effective address needed, by a simple switching or interchanging operation.

Additional objects and advantages of the present invention will become apparent upon consideration of the following description taken in conjunction with the accompanying drawings in which.

Figure 1:
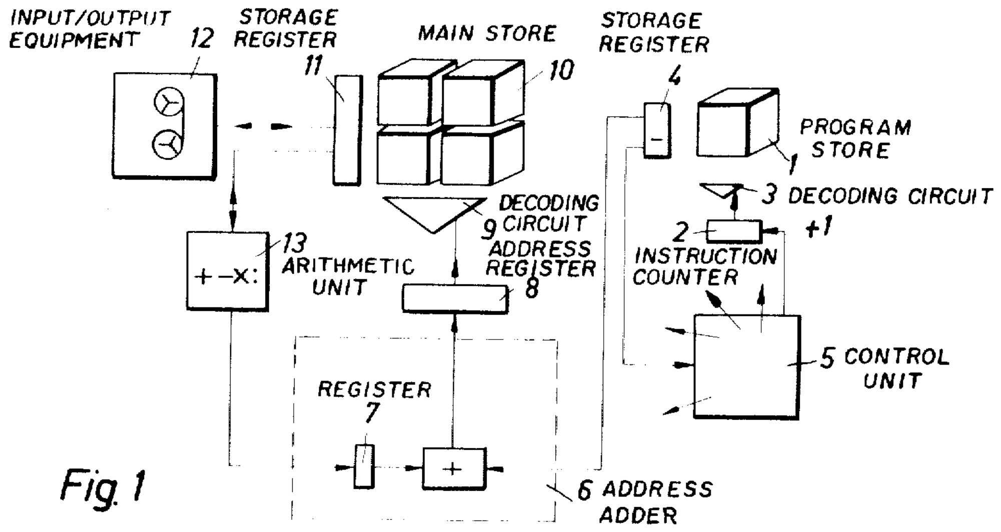
FIGURE 1 is a block diagram of a program controlled computer.

FIGURE 1 shows a program store 1 in which one or more programs are stored. An instruction counter 2 acts as an address register for the program store and controls the individual cells of the program store in succession, through a decoding circuit 3. The contents of the cells are transmitted to a storage register 4 which at the same time acts as an instruction register for the whole computer because it always temporarily stores the instruction which has just been provided for execution, with its operation part and its address part. Whereas the operation part acts on a control unit 5 in such a manner that the required operation is carried out by the computer, the address part only contains a relative address which is additively combined, in an address adder 6, with a reference address stored in a separate register 7, before being supplied to an address register 8 as an effective address. The contents of this address register are decoded in a main-store decoding circuit 9 and determine one cell of the main store 10 which is provided to receive calculating data. This store is constructed on the same principle as the program store so that in many cases both stores may form a single structural unit and be controlled through a common address register in time multiplex operation.

The main store may contain, for instance, four blocks of core stores, and exchanges data with the rest of the computer through a storage register 11, which is capable of receiving the contents of one cell of the store. In the figure, one block 12 is used to symbolize all the input and output equipment, and one block 13 is used to indicate structure which serves as an arithmetic unit. Both of these blocks exchange data with the storage register 11 in both directions. For reasons of clarity, all those lines which do not directly affect the invention are omitted.

Figure 2:
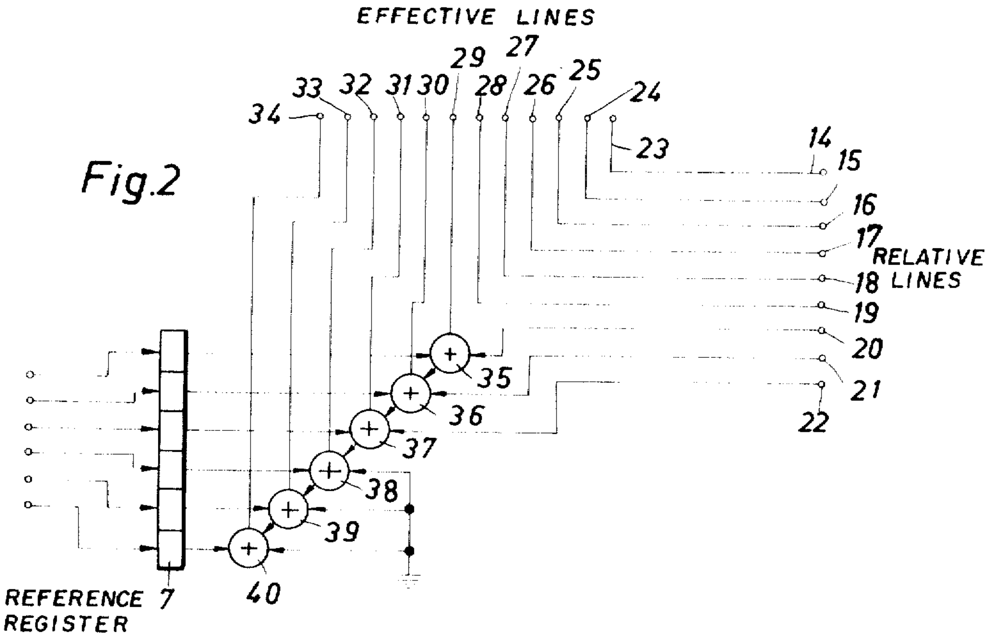
FIGURE 2 is a block diagram of the address adder.

Within the scope of this general scheme, the invention lies in the special construction of the address adder 6, which is illustrated in more detail in FIGURE 2. In this figure, the data transmitting lines, which are taken to the address adder and go out therefrom, are explicitly given, in contrast to the illustration in FIGURE 1 where a whole information transmitting channel comprising a plurality of binary places is always represented symbolically by a single line.

The relative addresses associated with the instructions may, for example, comprise nine binary places corresponding to the nine binary lines 14 to 22. The reference address, which is stored in the register 7, may comprise $m$, for example $m=6$, binary places, while the effective address, which is obtained in the address adder, may comprise twelve binary places. Accordingly, twelve binary lines 23 to 34 are connected to the store address register 8 of the main store. According to the invention, only the $n$ binary places having the highest value (in the present case $n=3$) of the relative address are altered by the address adder by being additively combined with the three binary places having the lowest value in the reference address.

The adding unit accordingly comprises six so-called full adders 35 to 40, the carry output of which is connected to the carry input of the full adder having the next higher value. The three full adders 35 to 37 associated with the lower value places are connected to the three lines 20 to 22 associated with the highest value places of the relative address, and to the three elements of the register 7 associated with the lowest value places of the reference address. The three higher-value full adders merely process the carry coming from the lower value places. They are only acted upon by the three higher-value elements of the register 7, while there are no more corresponding lines of the relative address. The resulting free inputs of these full adders may, for example, be jointly grounded so that the binary value zero is always supplied through these inputs.

The outputs of the address adder are thus divided into two groups, one of which comprises the six lower-value outputs 23 to 28 which are directly connected to the six lower-value inputs 14 to 19 for the relative address. The group of six higher-value outputs 29 to 34 is connected to the outputs of the six full adders.

In the event of a store capacity which is enlarged in comparison with the embodiment illustrated, the longer effective address necessary is formed as a result of the fact that the lowest value line 20 of the three relative-address lines taken to the full adders, and the lines 14 to 19, are connected through directly to the store register 8, while the remaining two lines 21 and 22 are connected to the two lowest-value full adders 35 and 36. The input to the full adder 37, which becomes free as a result, is grounded. An enlargement of the effective address is achieved solely by these minor circuit means without the program or other control means of the machine having to be modified as a result. The means according to the invention is of particular advantage for programs supplied by the manufacturer of the computer, which programs have to be introduced into computers having store constructions of different size.

The invention is naturally not restricted to the computer shown in FIGURE 1. In particular, the inclusion of the program store 1 in the main store 10 and hence the inclusion of the instruction sequence control in the address processing in accordance with the invention affords advantageous possibilities. It is then advisable for the reference addresses to be supplied to the adder not in a definite or permanent manner, but through switch means, so as to permit definitely addressed jumps which relate to the address regions with leading zeros. Such switch means e.g. may be inserted between the outputs of register 7 and the corresponding inputs of the full adders 35 to 40 of FIG. 2 in a way to switch over said inputs to ground. Thus the reference address will be replaced by zeros which in turn will appear as leading zeros in the effective address on the binary lines 32 to 34.

Figure 3:
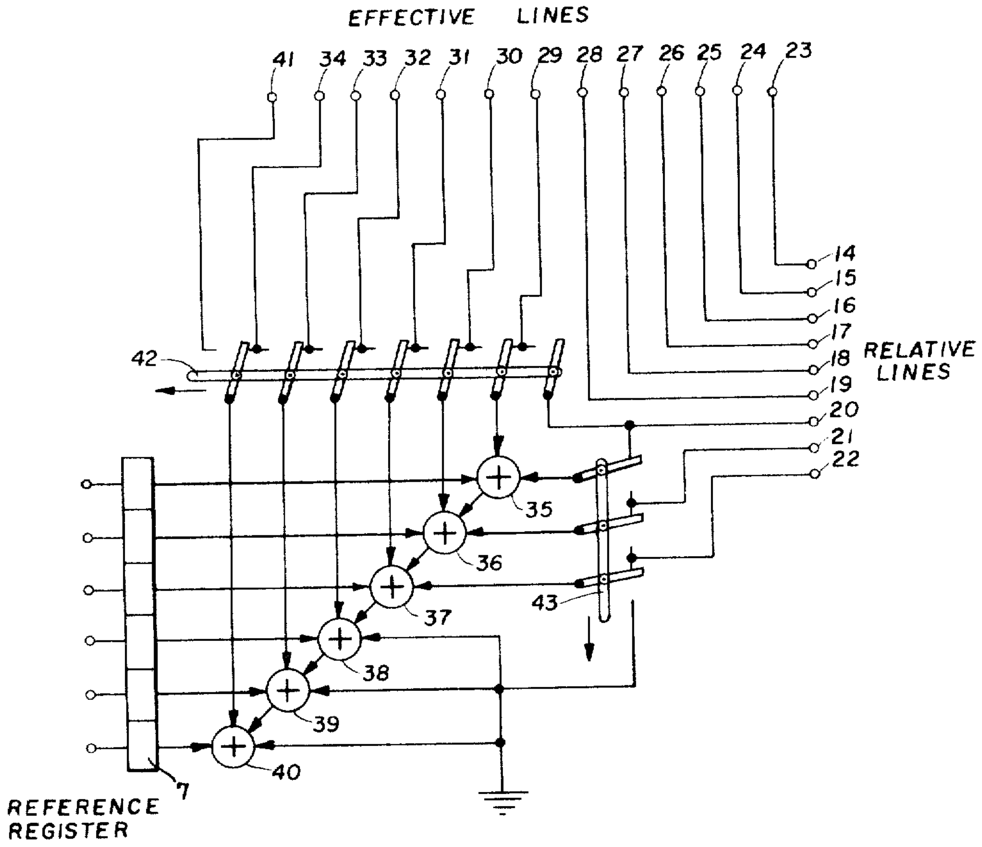
FIGURE 3 is a block diagram of an address adder, which is adapted to alter the length of the effective address by a simple switching operation.

FIG. 3 shows switching means to be inserted in the embodiment illustrated in FIG. 2, if the store capacity is to be enlarged to its double size. For this purpose store register 8 must have thirteen instead of twelve binary places and in turn a further binary line 41 must be added to the twelve output lines 23 to 34 of the address adder. Switching means 42, 43 serve to switch over from a twelve position effective address to a thirteen position effective address. In the position shown in FIG. 3 of the multiple switches 42, 43 reference address of register 7 and relative address of lines 14 to 22 are combined, as in FIG. 2, to form a twelve position effective address in lines 23 to 34, line 41 running idle. In the other position (not shown in FIG. 3) of switching means 42, 43 the number $n$ is reduced from 3 to 2 and the thirteenth output line 41 is connected to full adder 40.

It will be understood that the above description of the present invention is susceptible to various modifications, changes and adaptations, and the same are intended to be comprehended within the meaning and range of equivalents of the appended claims.

What is claimed is:

1. In a program-controlled computer having an addressable store and an address adder which combines instruction given relative addresses additively with a reference address to form an effective address which describes only one cell of the store of the computer, the improvement wherein the lines representing the relative addresses and the reference addresses have fewer binary places than are required to designate an effective storage address for a clear distinction between all storage cells, said adder having means for adding the leading $n$ value places of the relative address to the reference address which has $m$ value places, with $m>n$ to form an effective address having the required number of places.

2. The improvement as defined in claim 1 wherein said means are arranged so that $m=2n$.

3. The improvement as defined in claim 1 wherein said means is arranged so that $n$ is smaller when the store is larger or with a longer effective address and is larger when the store is smaller and comprising switching means for varying $n$ as above stated so that the number of relative address lines and references address lines remain the same whatever the construction of the store.

4. A device for program-controlled computers having an addressable store, comprising, in combination:

relative address means including a plurality of lines, one for each binary place, said means having fewer binary places than are required to designate an effective storage address for a clear distinction between all storage cells;

reference address means including a plurality of lines, one for each binary place and $m$ places altogether, said reference address means having fewer binary places than are required to designate an effective storage address for a clear distinction between all storage cells; and address adder means connected to the lines of said relative and reference address means for combining these addresses additively to form an effective address which describes one cell of the store of a computer by adding the leading $n$ places of the relative address to the $m$ places of the reference address with $m>n$.

5. A device as defined in claim 4 wherein said adder means are arranged so that $m=2n$.

6. A device as defined in claim 4 comprising switching means connected to said relative address means and said adder means for changing $n$ to be smaller when the effective address is longer and larger when the effective address is shorter so that the relative addresses and the reference addresses remain the same whatever the length of the effective address.

References Cited by the Examiner

UNITED STATES PATENTS 2,914,248 11/1959 Ross ---------------- 340—172.5

ROBERT C. BAILEY, *Primary Examiner.*

W. M. BECKER, P. J. HENON, *Assistant Examiners.*